(12) United States Patent
Alali et al.

(10) Patent No.: US 11,957,081 B2
(45) Date of Patent: Apr. 16, 2024

(54) ATMOSPHERIC PRESSURE ISOLATION FOR IRRIGATION APPLICATIONS

(71) Applicant: Jehad Alali, Hatay (TR)

(72) Inventors: Jehad Alali, Hatay (TR); Salem Alali, Hatay (TR)

(73) Assignee: Jehad Alali, Hatay (TR)

( * ) Notice: Subject to any disclaimer, the term of this patent is extended or adjusted under 35 U.S.C. 154(b) by 216 days.

(21) Appl. No.: 17/615,855

(22) PCT Filed: Jun. 9, 2020

(86) PCT No.: PCT/TR2020/050499
§ 371 (c)(1),
(2) Date: Dec. 2, 2021

(87) PCT Pub. No.: WO2020/251497
PCT Pub. Date: Dec. 17, 2020

(65) Prior Publication Data
US 2022/0304261 A1    Sep. 29, 2022

(30) Foreign Application Priority Data
Jun. 14, 2019  (WO) ............... PCT/TR2019/050443

(51) Int. Cl.
*A01G 25/06* (2006.01)
(52) U.S. Cl.
CPC ................... *A01G 25/06* (2013.01)

(58) Field of Classification Search
CPC ...................................... A01G 25/06
See application file for complete search history.

(56) References Cited

U.S. PATENT DOCUMENTS

| 4,293,237 A | 10/1981 | Robey et al. | |
| 4,348,135 A * | 9/1982 | St. Clair | A01G 25/06 47/1.01 R |
| 6,959,882 B1 * | 11/2005 | Potts | A01G 25/06 239/548 |

FOREIGN PATENT DOCUMENTS

| CA | 1213733 A | | 11/1986 |
| CN | 108040829 A | * | 5/2018 |
| JP | S54128133 A | | 10/1979 |
| WO | 2009151293 A2 | | 12/2009 |

* cited by examiner

*Primary Examiner* — Janine M Kreck
(74) *Attorney, Agent, or Firm* — Rivka Friedman

(57) ABSTRACT

An irrigation system includes at least one water source; at least one water pump-connected to the at least one water source with an irrigation pipe to transport water; at least one air pump connected to the irrigation pipe coming out of the at least one water pump to increase an amount of a water transport; at least one drain cylinder, wherein the irrigation pipe and a ventilation pipe are attached on the at least one drain cylinder; at least one main body; at least one water inlet-outlet hole, wherein the irrigation pipe is attached on the at least one water inlet-outlet hole and located on the at least one main body; at least one drain air hole, wherein the ventilation pipe is attached on the at least one drain air hole and located on the at least one main body.

13 Claims, 6 Drawing Sheets

Section A-A

Section B-B

Detail A ical study attached with the scientific research. Because of the radical difference of environmental and climatic conditions prevailing in the Arab region from those prevailing in the study and manufacturing areas, and the consequent disastrous negative effects on the yield of water unit resulting from a lack of air saturation in water and difference of ability on the heat absorption between the water and the soil and High rate of evaporation specially in the clay soil. Flotation or runoff irrigation method is better than modern irrigation methods in clay soils. However, its disadvantages are: activation of the capillary properties due to compacting of soil during runoff as a roller, growth of weeds, and deep leakage in sandy soils.

ATMOSPHERIC PRESSURE ISOLATION FOR IRRIGATION APPLICATIONS

CROSS REFERENCE TO THE RELATED APPLICATIONS

This application is the national stage entry of International Application No. PCT/TR2020/050499, filed on Jun. 9, 2020, which is based upon and claims priority to Turkish Patent Application No. PCT/TR2019/050443, filed on Jun. 14, 2019, the entire contents of which are incorporated herein by reference.

TECHNICAL FIELD

The present invention relates to irrigation system used for transportation water without water loss due to steam with low energy consumption.

BACKGROUND

Irrigation is the process of applying controlled amounts of water to plants at needed intervals. Irrigation helps to grow agricultural crops, maintain landscapes, and revegetate disturbed soils in dry areas and during periods of less than average rainfall. Irrigation also has other uses in crop production, including frost protection, suppressing weed growth in grain fields and preventing soil consolidation. In contrast, agriculture that relies only on direct rainfall is referred to as rain-fed. (https://en.wikipedia.org/wiki/Irrigation)

Irrigation systems are also used for cooling livestock, dust suppression, disposal of sewage, and in mining. Irrigation is often studied together with drainage, which is the removal of surface and subsurface water from a given area. (https://en.wikipedia.org/wiki/Irrigation)

The so-called modern irrigation techniques imported from the study countries and the manufacturer is a major national disaster in the dry areas and semi-dry in accordance with a digital study attached with the scientific research. Because of the radical difference of environmental and climatic conditions prevailing in the Arab region from those prevailing in the study and manufacturing areas, and the consequent disastrous negative effects on the yield of water unit resulting from a lack of air saturation in water and difference of ability on the heat absorption between the water and the soil and High rate of evaporation specially in the clay soil. Flotation or runoff irrigation method is better than modern irrigation methods in clay soils. However, its disadvantages are: activation of the capillary properties due to compacting of soil during runoff as a roller, growth of weeds, and deep leakage in sandy soils.

Subsurface irrigation methods or the leaky piping method discloses that it is a porous tube made from recycling rubber wheels buried at a depth of (15) cm due to its compressibility, and thus the flow of water stops flowing. The coefficient of homogeneity (50-60)% due to the difference in pressure between the beginning and the end of the irrigation line. The distance between irrigation lines (90) cm. Effectiveness of the water unit (40-45)% in the dry months. (Estimated Age: One Season). Cost ($850)/Acres Drip pressure method discloses that it is characterized by an excessive sensitivity 15 to frequent blockage due to the small drainage holes (4-5). Connected to pressure plastic tubes. Buried beneath the surface to a depth of (30 cm). Reduced acids are added to irrigation water to resist calcification blockage and residual compost and roots. The distance between irrigation lines (70) cm, homogenization factor (60-70)%. Irrigation efficiency (70-80)% in case of non-blocking.

Estimated age (15) years at the manufacturer's discretion. It costs 1100/acres.

It is well known in the soil language that the forces affecting the movement of soil water are the force of gravity and the force of evaporation and the force of physical adsorption, and that the force of physical absorption is the weakest force among the forces affecting the movement of water, due to it is under the influence of the force of gravity on the one side and the force of evaporation on the other side, which makes most Irrigation water is lost between deep leakage and severe evaporation. Consequently, activating the force of the physical adsorption of agricultural soil by activating the force of surface tension and employing it in irrigation uses is a broad scientific breakthrough that serves the whole of humanity, especially in arid and semi-arid regions. (Surface tension is the strength of fluid adhesion to solid objects stronger than the force of adhesion to each other).

SUMMARY

The object of the present invention is to realize that irrigation system used for transportation water without water loss due to steam with low energy consumption.

Another object of the present invention is to realize the irrigation system that provides homogeneity irrigation of arid or semi-arid regions.

BRIEF DESCRIPTION OF THE DRAWINGS

A method realized to fulfil the objective of the present invention is illustrated in the accompanying figures, in which.

Figure 1:
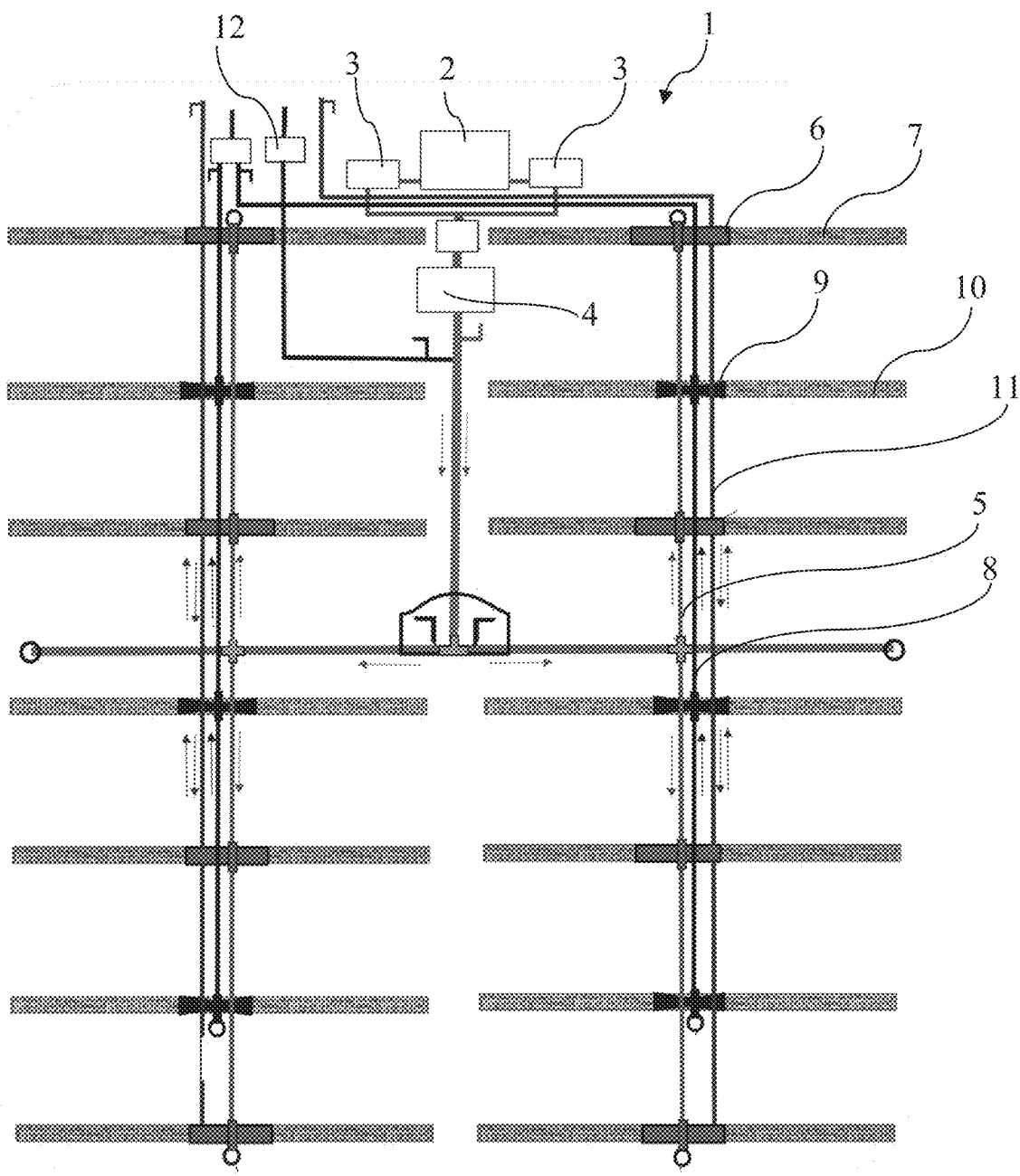
FIG. 1 is sketch view of the irrigation system
Figure 2:
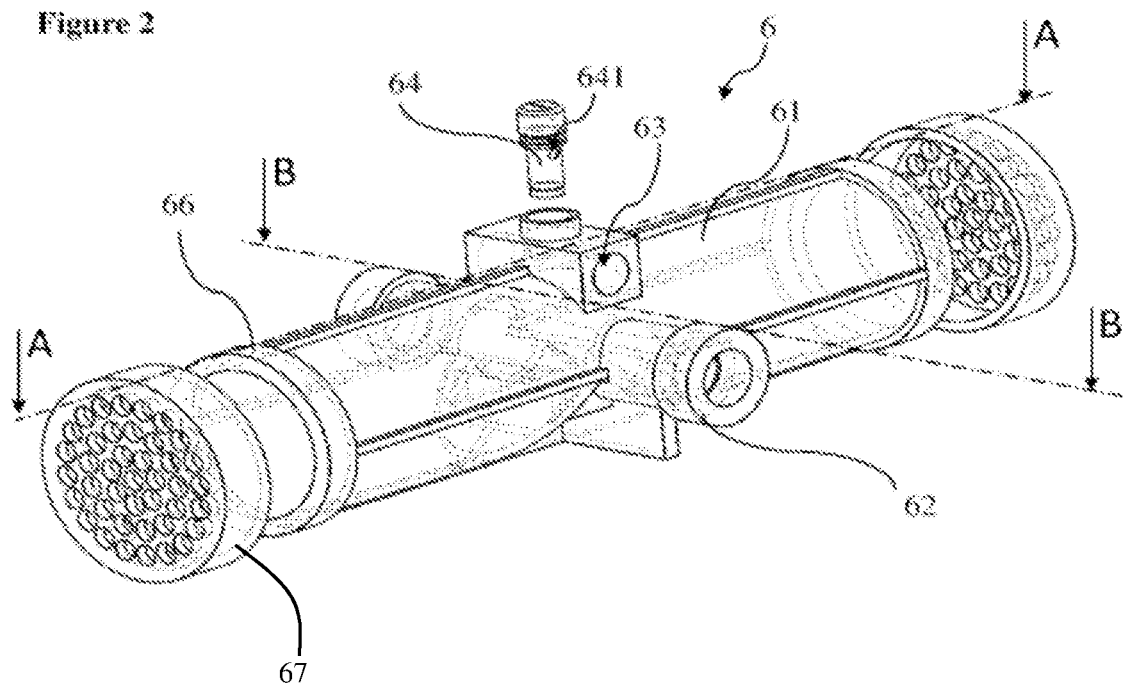
FIG. 2 is the perspective transparent view of the drain cylinder
Figure 3:
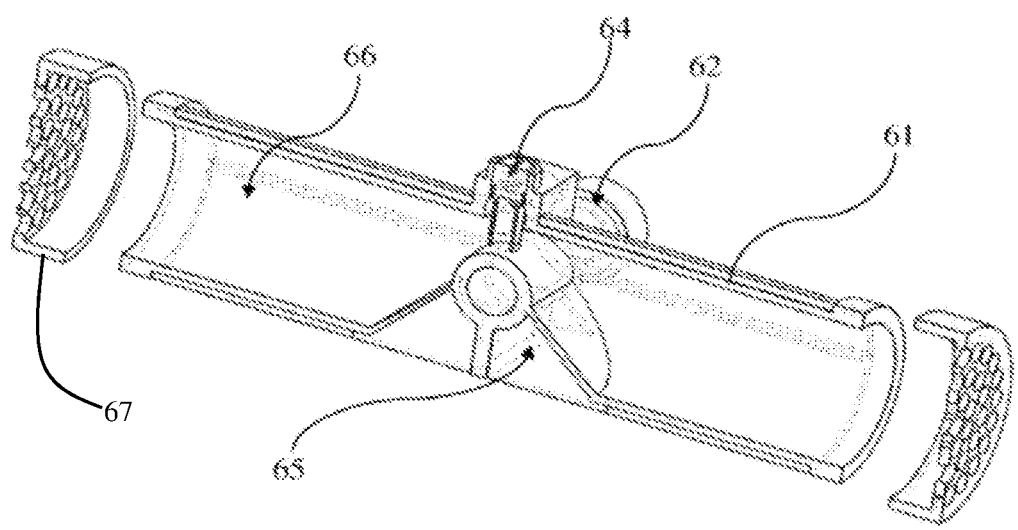
FIG. 3 is the perspective view of section A-A
Figure 4:
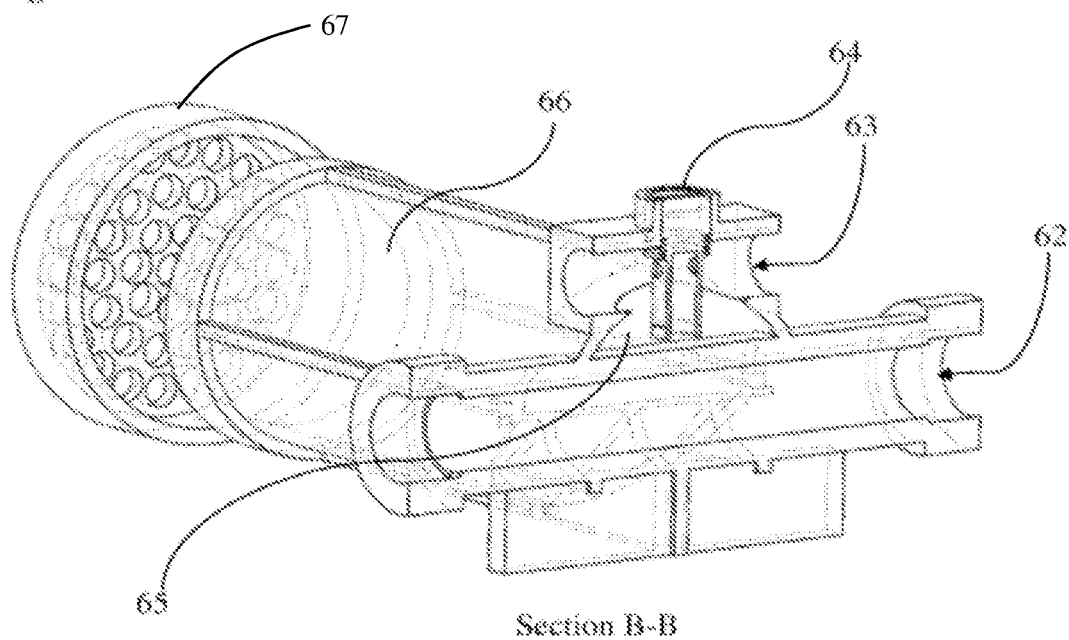
FIG. 4 is the perspective view of section B-B
Figure 5:
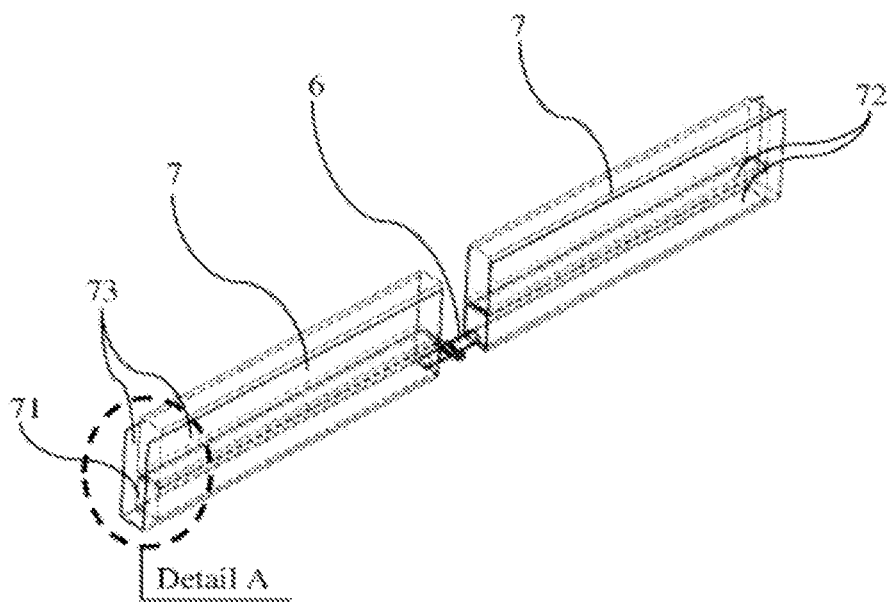
FIG. 5 is the perspective transparent view of irrigational channel
Figure 6:
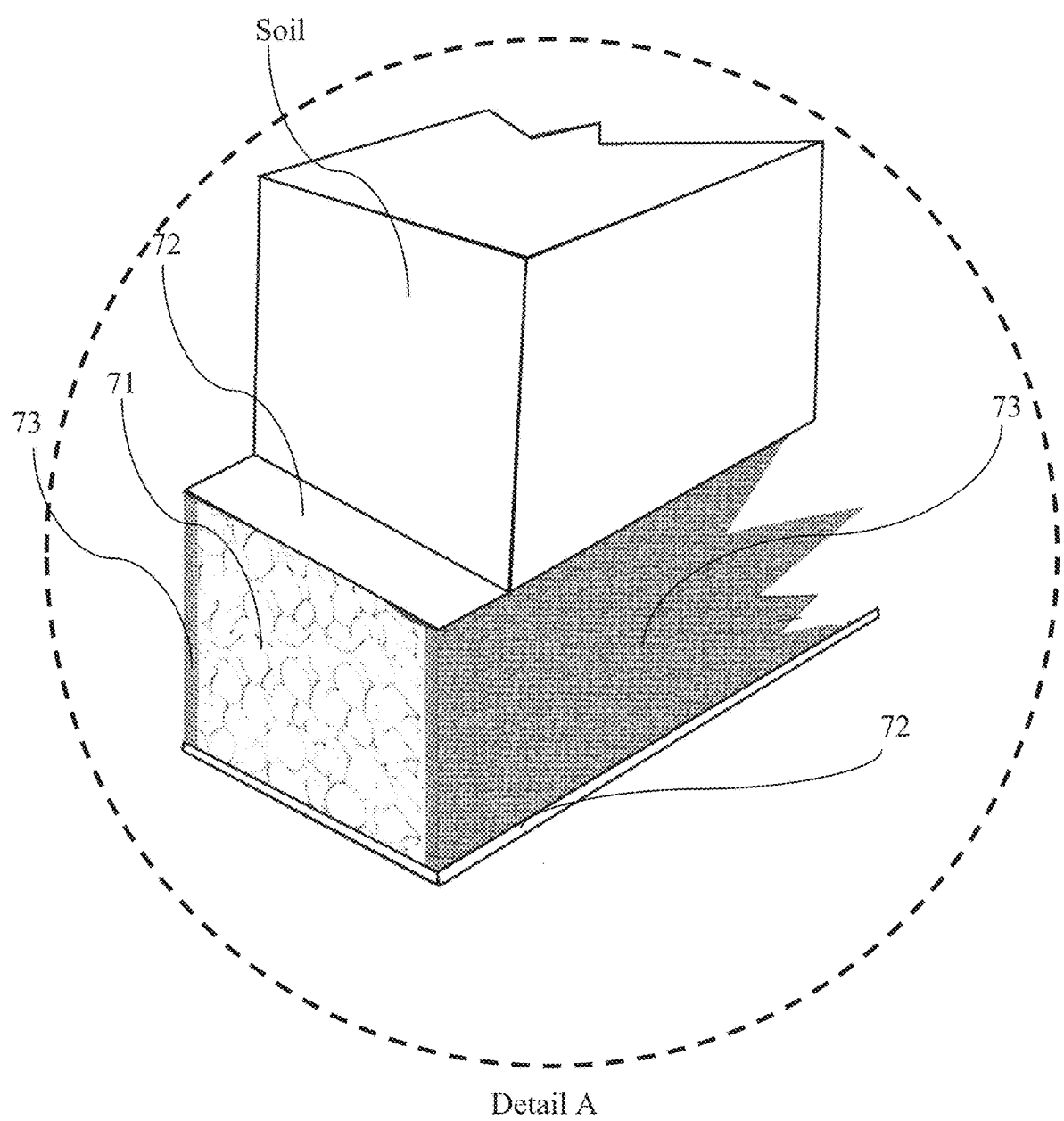
FIG. 6 is the perspective view of detail A
Figure 7:
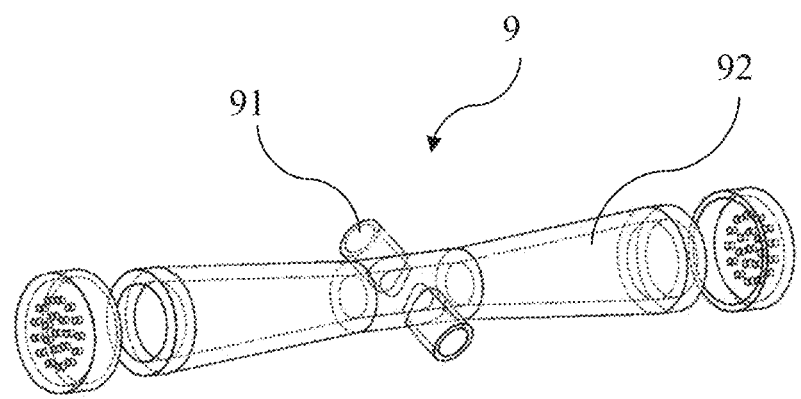
FIG. 7 is the perspective transparent view of the isolation cylinder
Figure 8:
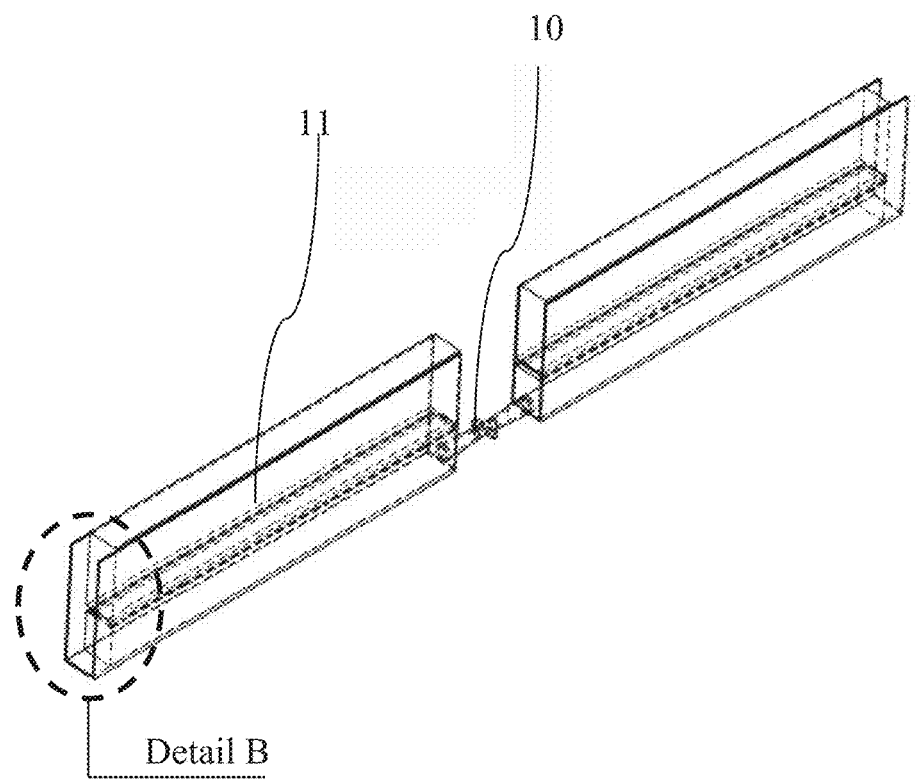
FIG. 8 is the perspective transparent view of isolation channel
Figure 9:
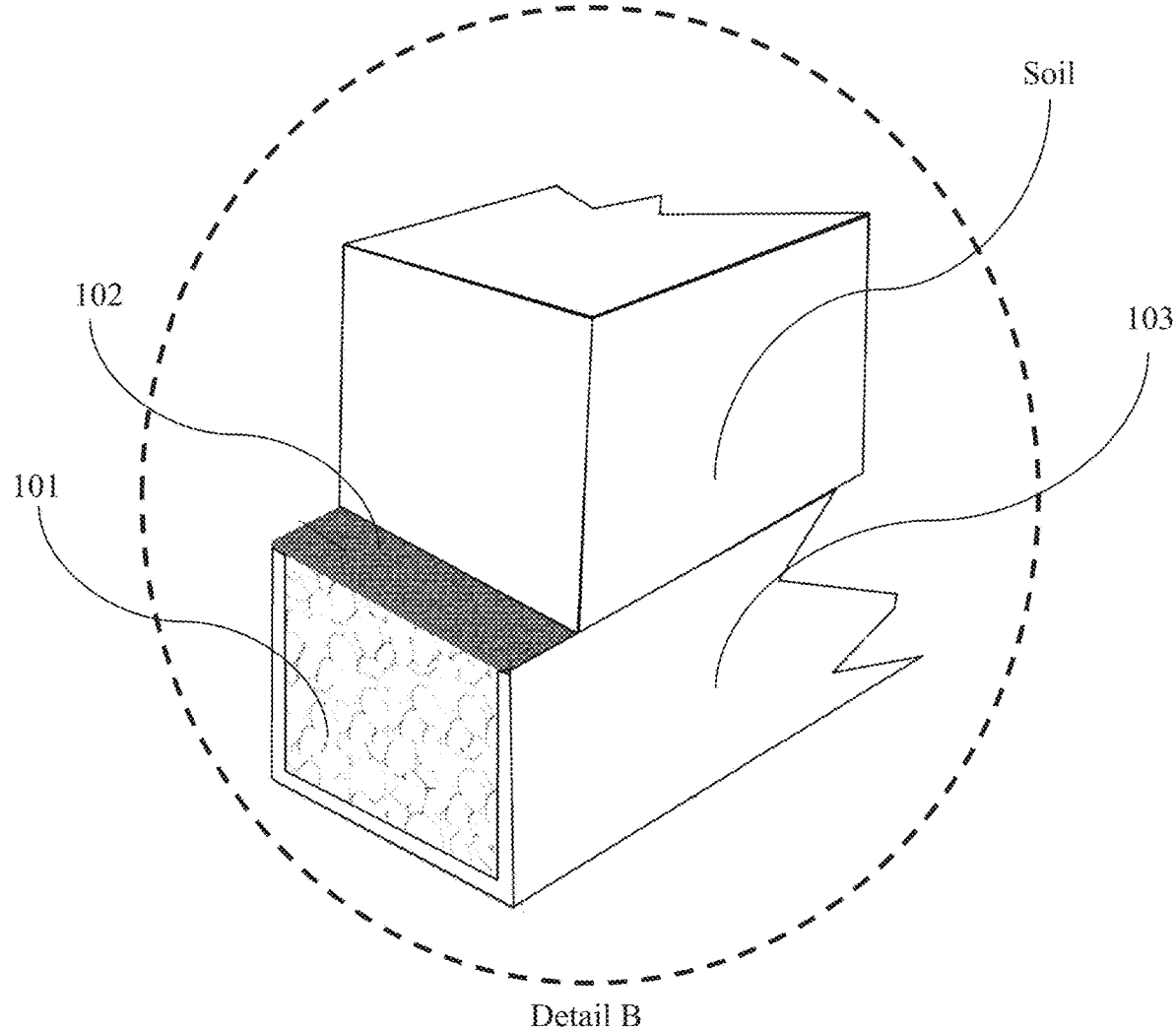
FIG. 9 is the perspective view of detail B

The parts illustrated in the figures are individually numbered where the numbers refer to the following:

1. Irrigation system
2. Water source
3. Filter
4. Water pump
5. Irrigation pipe
6. Drain cylinder
   61. Main body
   62. Water inlet-outlet hole
   63. Drain air hole
   64. Capsule
      641. Flow hole
   65. Vacuum channel
   66. Drain hole
   67. Scupper 7. Irrigation channel
   71. Gravel zone
   72. Impermeable mat
   73. Perforated polyethylene
8. Suction pipe
9. Isolation cylinder
   91. Isolation air hole
   92. Isolation hole
10. Isolation channel
    101. Suction gravel zone
    102. Suction impermeable mat
    103. Suction perforated polyethylene
11. Ventilation pipe
12. Air pump

DETAILED DESCRIPTION OF THE EMBODIMENTS

An irrigation system (1) comprises
at least a water source (2),
at least a filter (3) which is connected to the water source (2) with an irrigation pipe (5) due to filtration water,
at least a water pump (4) which is connected to the water source (2) with the irrigation pipe (5) to transport water,
at least an air pump (12) which is connected to the irrigation pipe (5) coming out of the water pump (4) to increase the amount of the water transport,
at least a drain cylinder (6) on which the irrigation pipe (5) and a ventilation pipe (10) are attached,
at least main body (61),
at least a water inlet-outlet hole (62) on which the irrigation pipe (5) is attached and located on the main body (61),
at least a drain air hole (63) on which the ventilation pipe (10) is attached and located on the main body (61),
at least a capsule (64) located in a hole which is drilled on the main body (61) and extending up to the water inlet-outlet hole (62),
at least a flow hole (641) located on a capsule (64) and inside the drain air hole (63) to ensure that the air in the water is evacuated,
at least a vacuum channel (65) located in the main body (61) and is connected to capsule (64) and water inlet-outlet hole (62),
at least drain hole (66) which is located on the main body (61) and has a scupper (67).
at least an irrigational channel (7) which is placed under the ground and in which the drain cylinder (6) is placed,
at least one gravel zone (71) into which the drain cylinder (6) is placed,
at least two impermeable mats (72) placed above and below the gravel zone (71),
at least two perforated polyethylene (73) placed on either side of the gravel zone (71) to ensure that water passes into the ground,
at least an isolation cylinder (9), on which a suction pipe (8) is attached,
at least an isolation air hole (91), on which a suction pipe (8) is attached,
at least an isolation hole (92), which has a conical cylinder shape and connected to the isolation air hole (91),
at least an isolation channel (10) which is placed under the ground and in which the isolation cylinder (9) is placed,
at least one suction gravel zone (101) into which the isolation cylinder (9) is placed,
at least one suction impermeable mat (102) placed above the suction gravel zone (101),
at least one suction perforated polyethylene (103) placed on three side of the suction gravel zone (101) to ensure that air passes into the ground, The irrigation system (1) comprises the water source (2). The water source (2) can be water tank or flowing water source. To clean a water coming from the water source (2), filter (3) is connected to the water source (2) with the irrigation pipe (5). To transport water, there is the water pump (4) is connected to the water source (2) with the irrigation pipe (5). The air pump (12) which is connected to the irrigation pipe (5) coming out of the water pump (4) to increase the amount of the water transport. There is the drain cylinder (6) on which the irrigation pipe (5) and the ventilation pipe (10) are attached. The drain cylinder (6) is located under the ground and main purpose of it is that to water the soil. The drain cylinder (6) comprises the main body (61), the water inlet-outlet hole (62) on which the irrigation pipe (5) is attached and located on the main body (61). There is the drain air hole (63) on which the ventilation pipe (10) is attached and located on the main body (61). There is the capsule (64) located in a hole which is drilled on the main body (61) and extending up to the water inlet-outlet hole (62). To ensure that the air in the water is evacuated, the flow hole (641) located on a capsule (64) and inside the drain air hole (63). at least a vacuum channel (65) located in the main body (61) and is connected to capsule (64) and water inlet-outlet hole (62). The drain hole (66) which is located on the main body (61) and has a scupper (67). The irrigational channel (7) which is placed under the ground and in which the drain cylinder (6) is placed. There is the gravel zone (71) into which the drain cylinder (6) is placed and two impermeable mats (72) placed above and below the gravel zone (71). Two perforated polyethylene (73) placed on either side of the gravel zone (71) to ensure that water passes into the ground. The air pump (12) is pumping air into the irrigation pipes in order to raise the air pressure, helps to activate the force of surface tension in part due to the low pressure inside the drain cylinder (6) and irrigational channel (7), especially in sandy soils. Furthermore, the air pump ventilates the entire bio range of agricultural soils thus accelerating growth and increasing production and quality.

The water is coming from the water source (2) with irrigation pipe (5). To increase water pressure of the irrigation pipe (5), the air pump (12) is attached the irrigation pipe (5). Thanks to the air pressure which is come from air pump (12), inside the irrigation pipe (5), the water can travel longer distances. In another word, the water and air together can travel long distance inside the irrigation pipe (5). The irrigation pipe (5) is connected to the drain cylinder (6) and, air and water is transferred into the drain cylinder (6). Drain cylinder (6) has water inlet-outlet hole (62) and the irrigation pipe (5) is attached to the water inlet-outlet hole (62). The water and air enter the main body (61) through the water inlet-outlet hole (62). Then some of the air and water are expelled through the capsule (64) on the main body (61). The air is vacuumed by vacuum channel (65) and going out thanks to flow hole (641). The water goes to the drain hole (66). Remaining air and water go out the main body (61) by using the irrigation pipe (5) attached water inlet-outlet hole (62) and go to another drain cylinder (6). The air comes from the flow hole (641) and goes out from the main body (61) by using the ventilation pipe (11) attached the drain air hole (63). The water goes out to the gravel zone (71) from the drain hole (66). the water goes to perforated polyethylene (73) from the gravel zone (71) and then goes the soil for the irrigation. As a result of that the irrigation system (1) used for transportation water without water loss due to steam with low energy consumption. Furthermore, the irrigation system (1) that provides homogeneity irrigation of arid or semi-arid regions.

In an embodiment of the invention, there are the isolation cylinder (9), on which a suction pipe (8) is attached, the isolation cylinder (9) is located under the ground. There is isolation air hole (91), on which a suction pipe (8) is attached. The isolation hole (92), which has a conical cylinder shape and connected to the isolation air hole (91). The isolation channel (10) which is placed under the ground and in which the isolation cylinder (9) is placed. The suction gravel zone (101) into which the isolation cylinder (9) is placed, suction impermeable mat (102) placed above the suction gravel zone (101) and suction perforated polyethylene (103) placed on three side of the gravel zone (101) to ensure that air passes into the ground. There is a suction pump on which the suction pipe (8). The main purpose of the isolation cylinder (13) is that the air in the soil is expelled. To achieve this purpose, there are suction perforated polyethylene (103) and the isolation hole (92) which has conical cylinder shape. Thanks to isolation cylinder (13), the air which come due to drain cylinder, in the soil is cleaned.

The scientific basis of the invention is based on the fact that a difference in pressure between irrigation channels (7) connected to the air pressure and isolation channels (9) from the air pressure leads to a huge pressure difference between the irrigation channels (7) and the isolation channels (9) which works to activate the force of surface tension in the capillary tubes in the region between the channels Irrigation and isolation channels (7, 9), and thus tension the water in a horizontal direction from the area surrounding the irrigation channels (7) to the area surrounding the isolation channels (9). When the isolation channels (9) are emptied from the air and isolated from the atmospheric pressure. They form in the walls touching the isolation channels (9), a core of connected chains of capillary tubes length (1-5) cm, then increases gradually with the progress of suction and isolation until to form a chains connected from the capillary tubes of high surface tension, moving horizontally from the saturated zone surrounding irrigation channels (7) to the area surrounding isolation channels (9) due to the high strength of surface tension below the depth of 30 cm resulting from soil compaction and as continues isolation the atmospheric pressure, the strength of the surface tension increases within the capillary tubes and the movement of water accelerates in the horizontal direction, as is the case in the process of transpiration of tree leaves.

Within the scope of these basic concepts, it is possible to develop a wide variety of embodiments of the inventive irrigation system (1). The invention cannot be limited to the examples described herein; it is essentially according to the claims.

What is claimed is:

1. An irrigation system (1), comprising:
    at least a water source (2);
    at least a water pump (4) which is connected to the water source (2) with an irrigation pipe (5) to transport water;
    at least an air pump (12) which is connected to the irrigation pipe (5) coming out of the water pump (4) to increase the amount of the water transport;
    at least a drain cylinder (6) on which the irrigation pipe (5) and a ventilation pipe (10) are attached;
    at least a main body (61);
    at least a water inlet-outlet hole (62) on which the irrigation pipe (5) is attached and located on the main body (61);
    at least a drain air hole (63) on which the ventilation pipe (10) is attached and located on the main body (61);
    at least a capsule (64) located in a hole which is drilled on the main body (61) and extending up to the water inlet-outlet hole (62);
    at least a flow hole (641) located on the capsule (64) and inside the drain air hole (63) to ensure that the air in the water is evacuated;
    at least a vacuum channel (65) located in the main body (61) and is connected to the capsule (64) and the water inlet-outlet hole (62);
    at least a drain hole (66) which is located on the main body (61) and has a scupper (67).

2. The irrigation system (1) in accordance with claim 1, wherein at least a filter (3) is connected to the water source (2) with the irrigation pipe (5) for filtration of water.

3. The irrigation system (1) in accordance with claim 1, wherein at least an isolation cylinder (9), on which a suction pipe (8) is attached.

4. The irrigation system (1) in accordance with claim 3, wherein at least an isolation air hole (91), on which the suction pipe (8) is attached.

5. The irrigation system (1) in accordance with claim 4, wherein at least an isolation hole (92), which has a conical cylinder shape and connected to the isolation air hole (91).

6. The irrigation system (1) in accordance with claim 3, wherein at least an isolation channel (10) which is placed under the ground and in which the isolation cylinder (9) is placed.

7. The irrigation system (1) in accordance with claim 3, wherein at least one suction gravel zone (101) into which the isolation cylinder (9) is placed.

8. The irrigation system (1) in accordance with claim 7, wherein at least one suction impermeable mat (102) placed above the suction gravel zone (101).

9. The irrigation system (1) in accordance with claim 7, wherein at least one suction perforated polyethylene (103) placed on three side of the suction gravel zone (101) to ensure that air passes into the ground.

10. The irrigation system (1) in accordance with claim 1, wherein at least an 15 irrigational channel (7) which is placed under the ground and in which the drain cylinder (6) is placed.

11. The irrigation system (1) in accordance with claim 1, wherein at least one gravel zone (71) into which the drain cylinder (6) is placed.

12. The irrigation system (1) in accordance with claim 11, wherein at least two impermeable mats (72) placed above and below the gravel zone (71).

13. The irrigation system (1) in accordance with claim 11, wherein at least two perforated polyethylene (73) placed on either side of the gravel zone (71) to ensure that water passes into the ground.

* * * * *